United States Patent [19]

Johnston, Jr. et al.

[11] 4,150,342

[45] Apr. 17, 1979

[54] METHOD AND APPARATUS FOR AUTOMATICALLY REACQUIRING A PREDETERMINED OUTPUT RADIATION FREQUENCY IN A TUNABLE LASER SYSTEM DESPITE MOMENTARY PERTURBATIONS OF LASER OSCILLATION

[75] Inventors: Thomas F. Johnston, Jr., Sunnyvale; James L. Hobart, Los Altos Hills; Robert C. Rempel, Los Altos; Gerald H. Williams, Sunnyvale, all of Calif.

[73] Assignee: Coherent, Inc., Palo Alto, Calif.

[21] Appl. No.: 812,698

[22] Filed: Jul. 5, 1977

[51] Int. Cl.² ............................................. H01S 3/10
[52] U.S. Cl. ............................................. 331/94.5 S
[58] Field of Search .................. 331/94.5 S, 94.5 C, 331/94.5 D, 94.5 M; 330/4.3

[56] References Cited

U.S. PATENT DOCUMENTS 3,967,211  6/1976  Itzkan et al. .................. 331/94.5 S
4,081,765  3/1978  Berg et al. .................... 331/94.5 S

OTHER PUBLICATIONS

Barger et al., Frequency Stabilization of a CW Dye Laser, Appl. Phys. Lett., vol. 22, No. 11 (Jun. 1, 1973) pp. 573-575.
Barger et al., Fast Frequency Stabilization of a CW Dye Laser, Appl. Phys. Lett., vol. 27, No. 1 (Jul. 1, 1975) pp. 31-33.

*Primary Examiner*—William L. Sikes
*Attorney, Agent, or Firm*—Limbach, Limbach & Sutton

[57] ABSTRACT

Method and apparatus are disclosed in a frequency controlled tunable laser system which may be tuned selectively by an operator to any predetermined output radiation frequency within its operating range and servo-locked to maintain that output frequency, for rapidly and automatically maintaining and reacquiring a predetermined output radiation frequency despite momentary interruptions or perturbations of laser oscillation.

10 Claims, 10 Drawing Figures

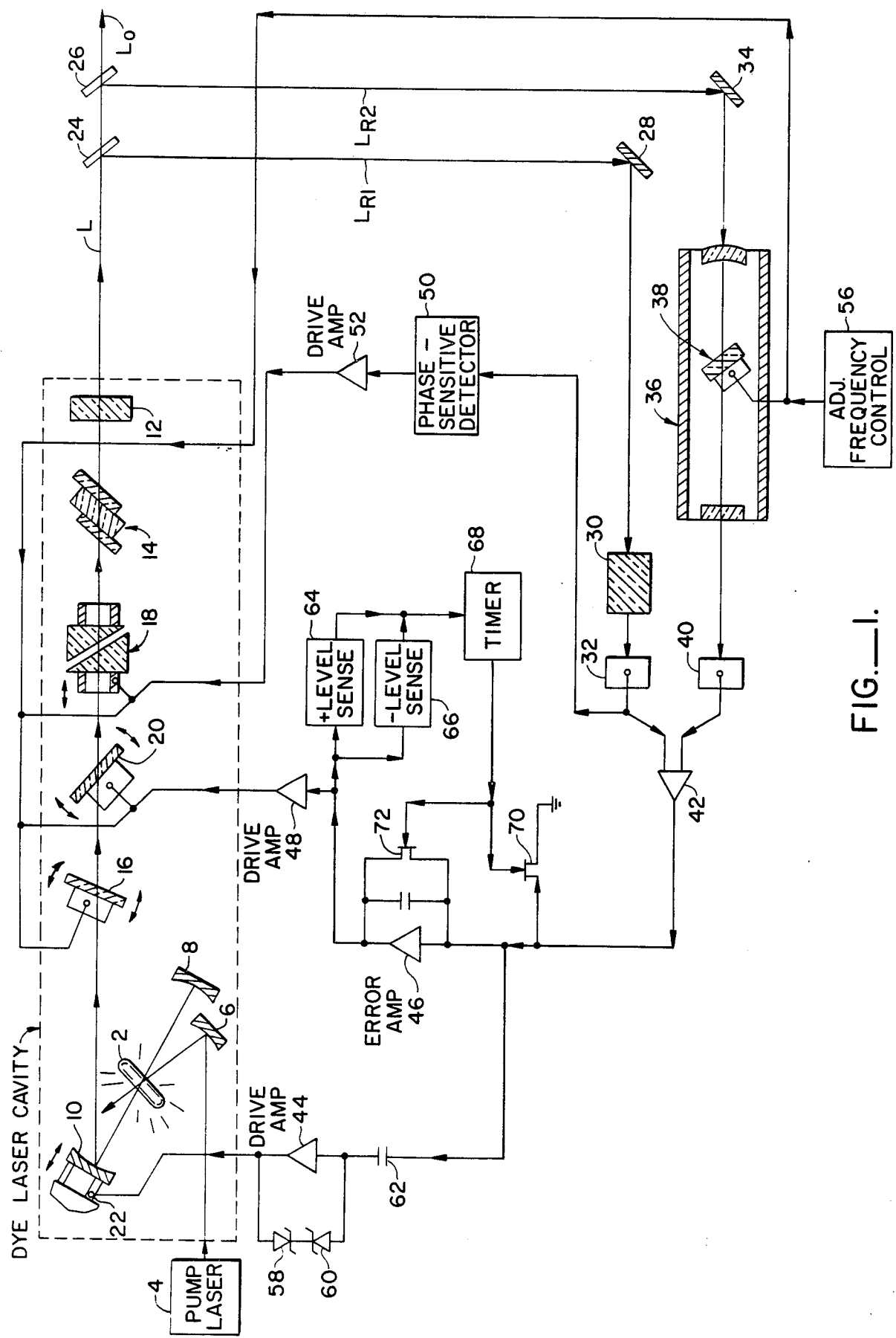
FIG._1.

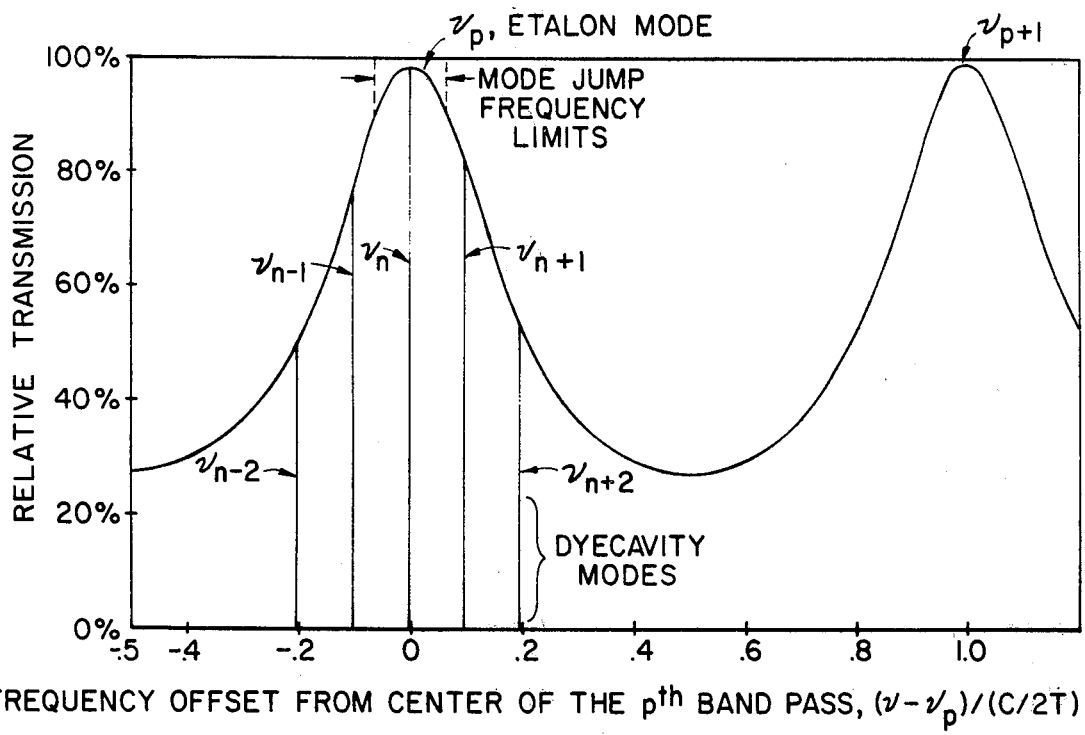
FIG._2.
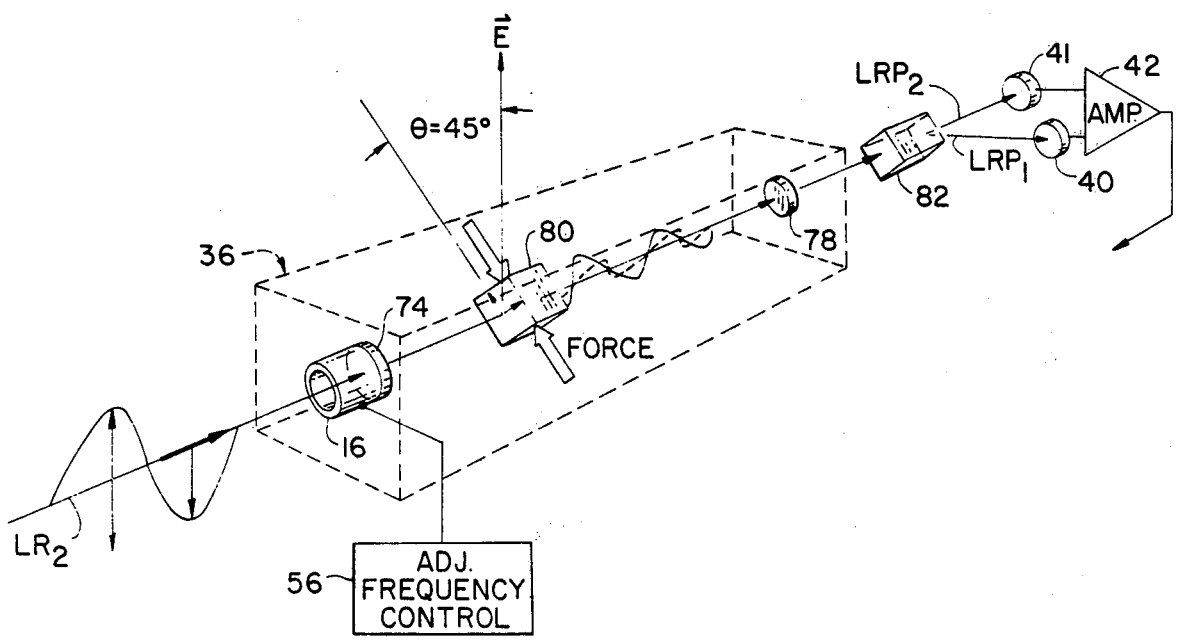
FIG._5.

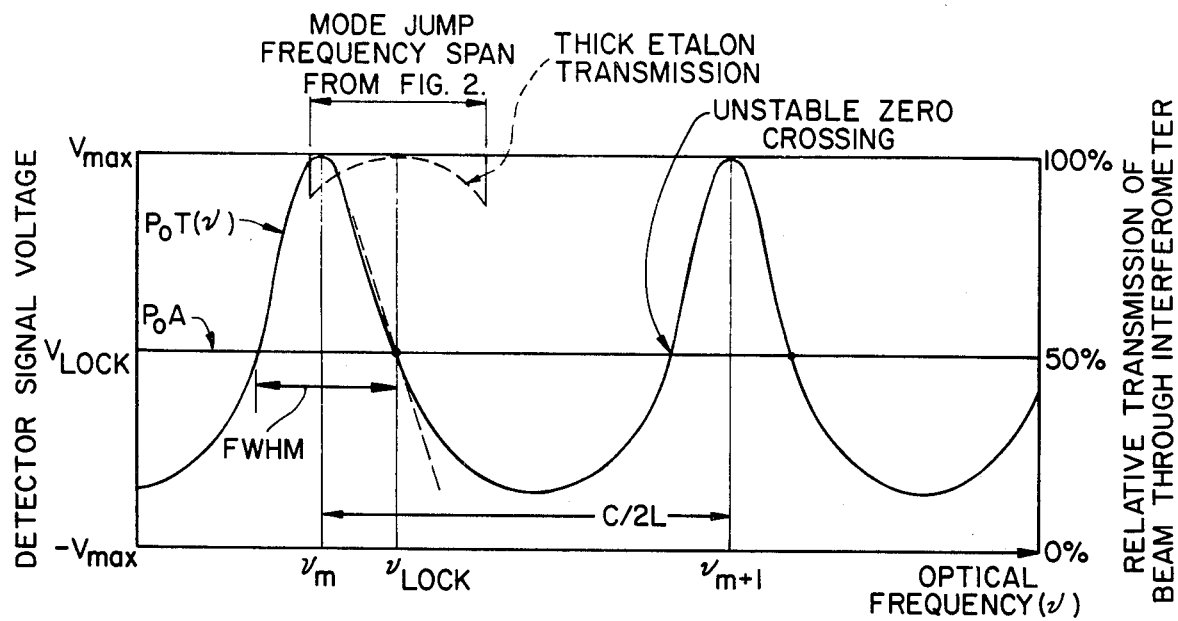
FIG._3.

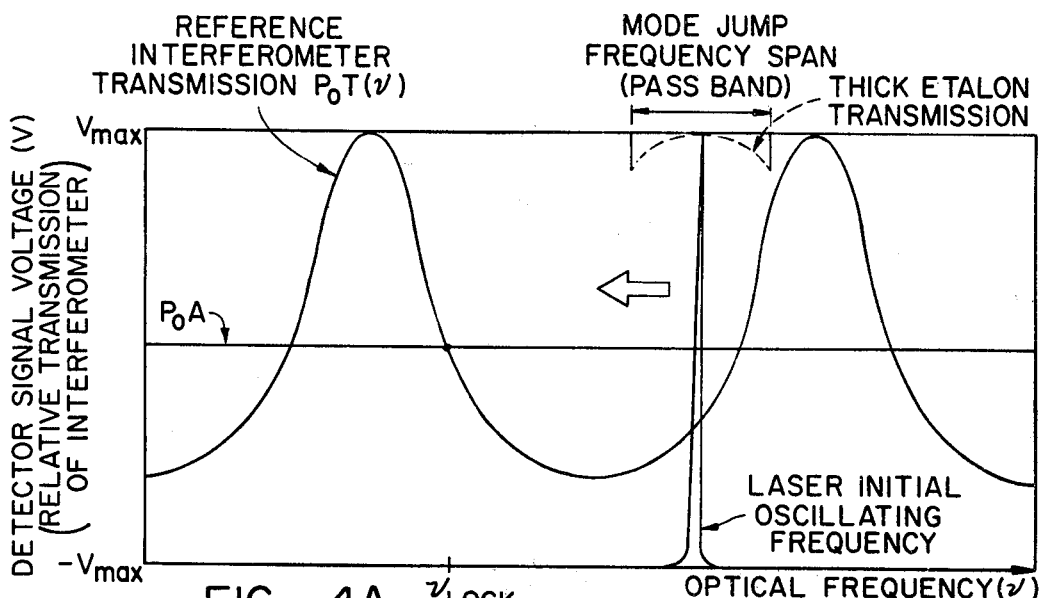
FIG._4A.
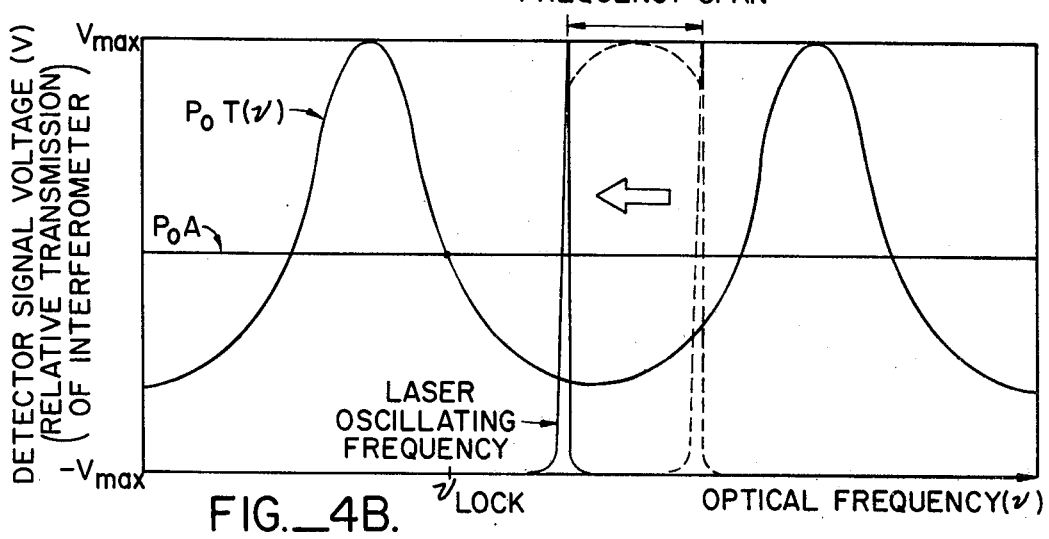
FIG._4B.
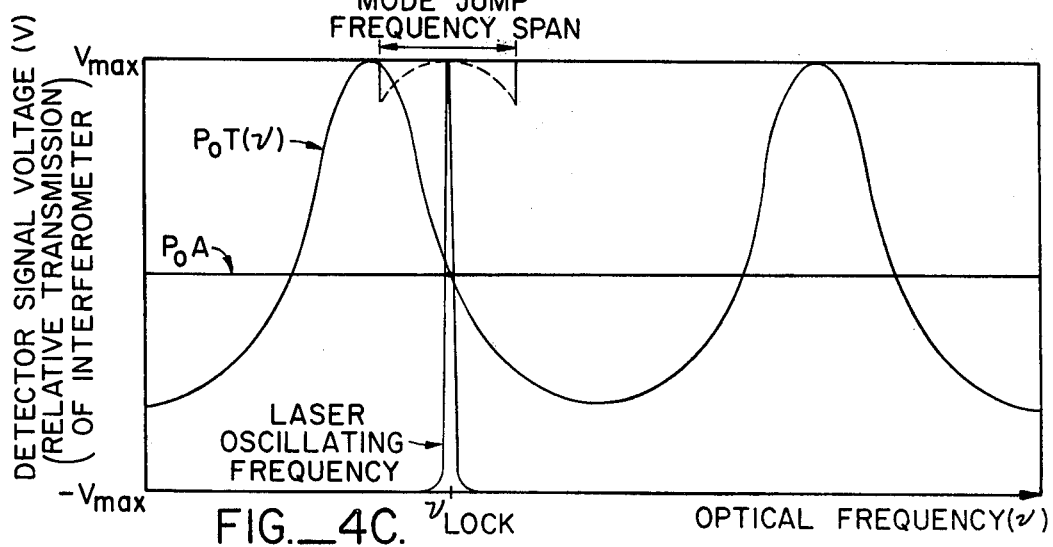
FIG._4C.

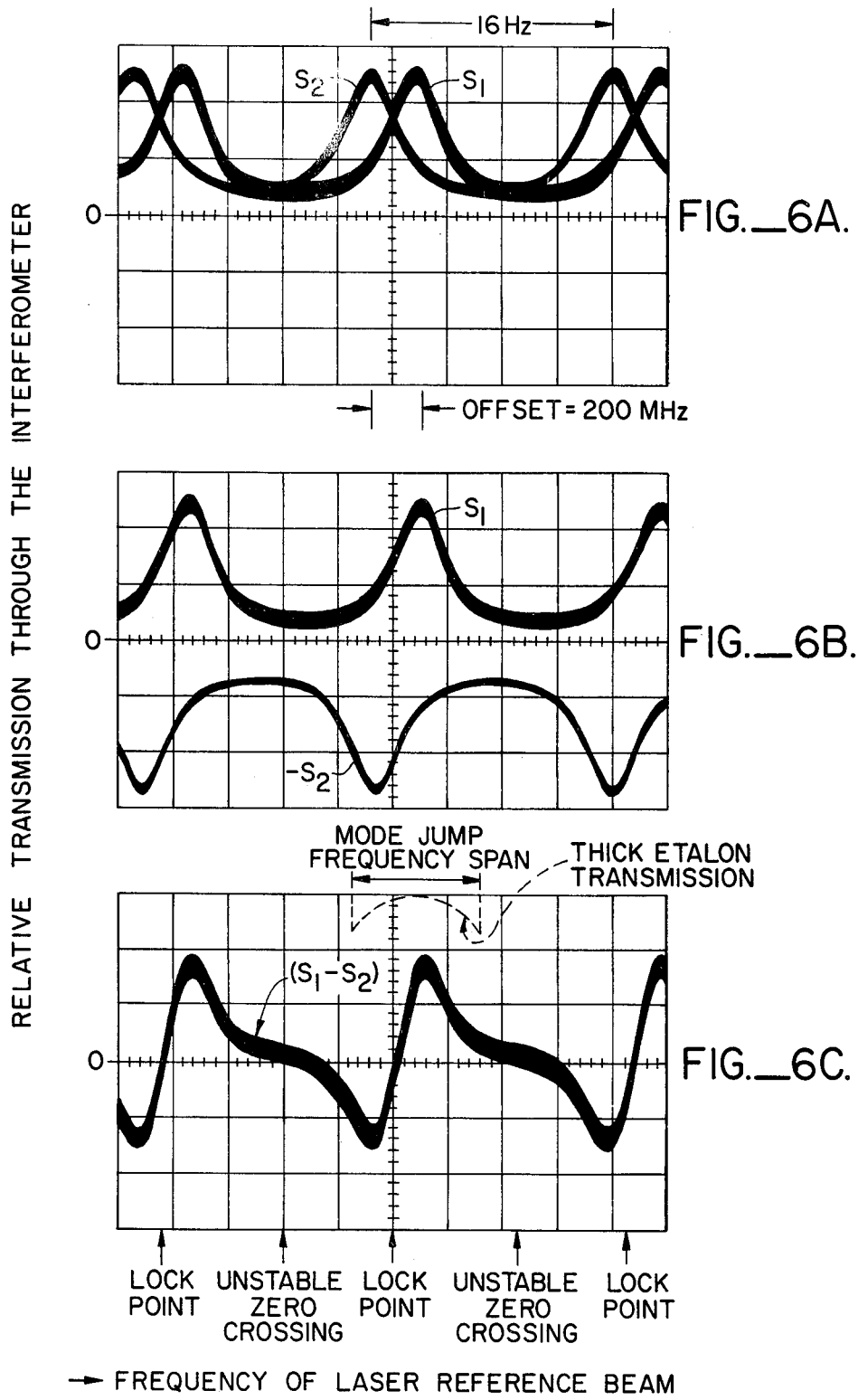

METHOD AND APPARATUS FOR AUTOMATICALLY REACQUIRING A PREDETERMINED OUTPUT RADIATION FREQUENCY IN A TUNABLE LASER SYSTEM DESPITE MOMENTARY PERTURBATIONS OF LASER OSCILLATION

BACKGROUND OF THE INVENTION

The development of continuous dye lasers now provide the scientific community with a source of tunable coherent radiation at visible wavelengths, and such lasers and their associated systems have undergone steady improvements in recent years both in output beam quality and narrowness and stability of the output beam frequency. Continuous dye lasers employ a flowing liquid, typically in the form of a fla, free-flowing jet stream, as an optically efficient means of coupling light into and out of the dye medium. The dye medium, in the form of this flowing liquid stream, is capable of withstanding the high power densities of the focused pump laser beam. However, flowing liquids such as the dye may contain bubbles and also may vary in thickness in response to fluctuations in the pressure head driving the flow, despite elaborate precautions in the form of pressure regulators and filters. These perturbations cause amplitude and frequency perturbations of the dye laser output, since even a tiny bubble can block the focal region in the dye and momentarily terminate the lasing function. The frequency perturbation results from the relationship expressing the frequency $v$, which, for the $n^{th}$ lasing mode is given by $$v_n = n(c/2D) \tag{Eq. 1}$$

where n is a large integer, c is the speed of light and D is the optical path length, including the dye stream thickness, between the end mirrors of the laser cavity. By equation 1 a thickness change of $\lambda/2$ (where $\lambda$ is the wavelength of light, between 4 and $8 \times 10^{-7}$ meters for visible wavelengths) produces a frequency change of $c/2D$ or 300 MHz for a typical cavity length D of 0.5 meters. In such a system the integer n is of the order $n = 2D/\lambda = 2 \times 10^6$. Since currently available dye lasers are capable of frequency stabilities of $\pm 1$ MHz or less, they are thus subject to very minute optical path length changes. Since temperature and air pressure variations may also cause variations in the length of the optical cavity, such variations may also produce output frequency changes of this order of magnitude. The presence of these problems has led to the development of means, such as servo "locking" of the dye laser output frequency to improve the frequency stability. Such arrangements have generally sought to lock the dye laser output frequency to equal that of some resonance of a stabilized reference interferometer (as in the manner disclosed by Barger, Sorem and Hall in "Frequency Stabilization of a CW Dye Laser", Applied Physics Letters 22, pp. 573-75, June 1, 1973, and by Barger, West and English in "Fast Frequency Stabilization of a CW Dye Laser, Applied Physics Letters 27, pp. 31-33, July 1975) or by use of atomic or molecular spectral features. This technique is used in particular with single frequency dye lasers, where a succession of increasingly narrow bandwidth filters is placed in the dye laser cavity to restrict oscillation to a single cavity mode, which represents a single value of the integer n.

Where a stable reference interferometer is used, its resonant frequencies are given by the relationship $$v_m = m(c/2L) \tag{Eq. 2}$$

where m is an integer, c is the speed of light as noted above, and L is the optical pathlength between the interferometer mirrors. While the prior art has incorporated such an approach, it has been concerned only with conditions around the specific, narrowly defined frequency lock point, primarily to control and eliminate the effects of dye frequency jitter or noise. Such prior art systems provide a stable output frequency as long as the system remains continuously locked to the servo frequency lock point, but have had no protection against loss of lock such as often occurs with the passage of a bubble or minor pressure variation through the dye stream. In these prior art systems the occurrence of such perturbations has generally limited the time periods of constant output frequency operation of the dye laser to a maximum on the order of ten minutes of continuous operation. Such prior art apparatus has not been capable of automatically and rapidly reacquiring the preselected locked dye laser output frequency when subjected to large momentary laser cavity length changes or momentary losses of lasing.

SUMMARY OF THE INVENTION

It is an object of the present invention to overcome certain of the limitations of the prior art and to provide for automatic and rapid reacquisition of a predetermined dye laser output frequency lock despite arbitrarily large momentary laser cavity length changes and momentary losses of lasing.

Briefly, the present invention contemplates a frequency controlled tunable laser system which may be selectively tuned to any predetermined output radiation frequency within its operating range and then servo locked to maintain that output frequency and to include within such system means for rapidly and automatically reacquiring the predetermined output radiation frequency despite momentary perturbations of laser oscillation. This system includes a tunable laser and a narrow bandpass, selectively adjustable optical filter mounted within the cavity of the laser for the selective tuning of the laser output radiation to the desired predetermined frequency. This optical filter is tunable over the laser operating frequency range at a predetermined maximum tuning rate and has pass bands sufficiently narrow that only a single laser cavity operating mode adjacent the center of one predetermined such pass band may obtain sufficient optical gain to oscillate. The frequency range within the predetermined pass band within which the laser cavity mode may vary and still oscillate is defined as the mode jump frequency span of the filter. The system further includes a feedback control servo system for locking the laser output radiation to the predetermined frequency, this control system including means for generating from the laser output radiation an electronic discriminant signal which has not more than one stable zero crossing lock point corresponding to the predetermined output frequency within that optical filter mode jump frequency span and which has no other zero crossings within the mode jump frequency span. The feedback control system further includes at least one laser frequency control element other than the adjustable optical filter positioned within the laser cavity and which is operable in response to the discriminant signal to adjust the laser output radiation frequency, and means for applying the discriminant signal to the frequency control element to drive the laser output radiation frequency toward the lock point within the mode jump frequency span, whereby the laser system may rapidly reacquire the predetermined output radiation frequency locking point despite arbitrary large momentary perturbations of the laser oscillation.

BRIEF DESCRIPTION OF THE DRAWINGS

A particularly preferred embodiment of the method and apparatus of this invention will be described in detail with reference to the following drawings in which:

FIG. 1 is a functional block diagram of a preferred embodiment of the laser system of this invention;

FIG. 2 is a graphical illustration of the relationship between the operating modes of the laser and the mode jump frequency limits of the etalon used in the system of this invention;

FIG. 3 is a graphical illustration of the relationship between the electronic discriminant signal generated by the apparatus of FIG. 1 and the mode jump frequency span of the thick etalon optical filter included within the laser cavity;

FIGS. 4A-4C are graphical illustrations of the events occuring during acquisition of frequency lock by the apparatus of FIG. 1;

FIG. 5 is a schematic representation of a second means for generating the electronic discriminant signal for use in the apparatus of FIG. 1; and FIGS. 6A-6C are illustrations of oscilloscope traces of the output signals of the detectors of the apparatus of FIG. 5, illustrating the manner in which the two output signals are combined to yield the desired electronic discriminant signal.

DESCRIPTION OF PREFERRED EMBODIMENTS

Basic System Description and Operation

Although the principles of the present invention may be practiced by various equivalent structures, the invention will be described in detail with respect to one particularly preferred embodiment incorporating a tunable dye laser and either of two particular types of frequency reference cavities. Those skilled in the art will readily appreciate the applicability of the invention to other types of equipment, including other types of lasers and control arrangements.

In the preferred embodiment used for purposes of illustration the tunable laser system is preferably a dye laser system as illustrated schematically in the simplified block diagram of FIG. 1. In FIG. 1 the dye laser cavity is represented as including all of the structure within the labeled broken line perimeter.

The dye stream which is excited by a pumping laser input is illustrated in cross-section as item 2. In a known manner, a laser beam from a pumping laser 4, which conveniently may be a continuous wave (CW) argon laser, is introduced into the dye laser cavity, off the dye laser optical axis, and is focused onto the dye stream 2 by a suitable mirror 6. As is well known, the focusing of such a laser beam of appropriate energy onto a stream of appropriate dye, such as Rhodamine 6G, will excite that dye stream and cause it to lase within the dye laser cavity. The resonant optical cavity of this dye laser now may be seen to be defined by end mirror 8, folding mirror 10 and partially transmissive opposite end mirror 12, with spectral range selecting birefringent filter 14, mode selecting etalon 16, a narrow band pass selectively adjustable optical filter 18 and frequency adjusting element 20 interposed. The narrow band pass selectively adjustable optical filter 18 desirably may be an adjustable thick etalon such as is disclosed in copending patent applications Ser. Nos. 692,537 to Berg and 720,198 to Johnston and Manoukian, both being assigned to the assignee of this application. Etalon 16 may conveniently be a conventional thin etalon such as is well known. Cavity folding mirror 10 desirably is mounted to a piezo-electric element 22 which may be controlled to provide for a fast rate of adjustment of the cavity optical path length for purposes to be described below. The slower adjusting element 20 desirably may be a tipping Brewster plate, angularly adjustable with respect to the optical axis for adjusting the frequency of the dye laser, in the manner described in the article "Direct Optical Measurement of Sodium Hyperfine Structure Using a CW Dye Laser and an Atomic Beam" by Schuda, Hercher and Stroud, 22 Applied Physics Letters No. 8, pp. 360-62 (1973). The birefringent filter 14 suitably may be structured such as described in Yarbrough et al U.S. Pat. No. 3,868,592. All of the elements 10, 16, 18 and 20 are mounted for movement in the directions indicated by the arrows of FIG. 1 to adjust the effective optical length and thus the output frequency of the dye laser in response to appropriate electronic control signals.

The etalons 16 and 18, the birefringent filter stack 14 and the tipping Brewster plate 20 are all of the general nature of filters for controlling the resonant frequency and thus the output frequency of the laser. For purposes of analysis, a tunable dye laser such as disclosed herein is at any instant in time equivalent to a single frequency dye laser having a single output frequency equal to the instantaneous frequency of the tunable laser. In such a single frequency dye laser the frequency control is by a series of filters generally similar to those described above, the narrowest filter typically being an etalon. As is known in the art, an etalon is a parallel sided plate of glass, partially mirrored to give multiple reflections which constructively interfere and produce a transmission pass band whenever an integral number (p) of half wavelengths of radiation fit precisely into the optical thickness (T) between the mirrored surfaces. For purposes of illustration the transmission function of an etalon of a thickness T with a 32% mirror reflectivity per surface is illustrated in FIG. 2. FIG. 2 illustrates the amplitudes and locations of the $n-2, ..., n+2$ dye cavity modes after transmission through the etalon, which frequencies are near the $p^{th}$ pass frequency of the etalon. Where such an etalon is the narrowest filter in a collection of filters within the cavity of the single frequency laser, then etalon reflectivity and thickness is designed such that the losses of all dye modes except the centered $n^{th}$ mode exceed the available net optical gain so that only the single frequency oscillates.

When the dye cavity length (D) decreases by several half wavelengths all of the dye cavity mode frequencies are shifted, or tuned, toward larger values. The $n^{th}$ mode frequency $\nu_n$ moves away from the etalon center frequency $\nu_p$, and the transmission loss for the $n^{th}$ mode increases. However, the $n-1^{st}$ mode frequency moves toward the center and its transmission loss decreases. At some point, called the upper mode jump frequency limit, oscillation will cease in the $n^{th}$ mode and jump back to oscillating at the lower loss n−1$^{st}$ mode. By symmetry, the upper and lower mode-jump limits should be equally offset from the center frequency $v_p$ at offsets ±½ (c/2D) respectively. However, when the n$^{th}$ mode of the laser oscillates, the net gain available to the other modes is decreased, so the initially oscillating n$^{th}$ mode persists beyond the expected symmetry point and the frequency span between mode-jump limits is observed in certain high gain dyes to broaden. In a strong dye such as Rhodamine 6G, for example, the mode-jump frequency span has been observed to be as large as 1.3 (c/2D). Due to this mode-jump effect, the output frequency is thus limited to a fairly narrow range, on the order of c/2D wide, regardless of the size of any perturbing thickness changes of the dye jet stream.

To maintain constant a predetermined output radiation frequency it is necessary to provide a feedback servo system such as that described in the copending Berg et al application Ser. No. 692,537, to adjust the laser cavity elements as necessary to control and maintain the desired frequency. Such a servo system suitably may be generally similar to that disclosed in the copending Wise application Ser. No. 701,856 and comprises, basically, means for generating a discriminant signal, that is a signal which passes through zero and changes sign when the controlled variable passes through the desired value, known as the lock point, and a properly phased amplifier which feeds back the amplified discriminant signal to control elements for controlling the variable. A small change of the controlled variable in either direction from the lock point generates an amplifier input to drive the variable back to the lock point. In a servo system such as desired for the present invention, the discriminant may have multiple lock points, with one for each value of the integer (m) specifying the referenced interferometer mode. Between each pair of lock points is one unstable point where the discriminant crosses zero but has a sign which drives the control variable to one of the adjacent lock points. It is an important feature of this invention that the discriminant signal for the dye laser frequency servo have, within the mode jump frequency span of the narrow band pass filter (the adjustable etalon 18 described above), not more than one lock point and no unstable zero crossing points. By this requirement, when a frequency excursion occurs which is very large or faster than the response time, or control rate, of the servo, the mode jump limiting action of the frequency filters limits the actual output radiation frequency change to a range within the acquisition range of the original reference interferometer mode, in a manner to be described below. Thus, once the uncontrolled excursion is over, the output frequency must automatically be driven to the original lock point, since there are no other stable operating points within reach of the servo system.

In practical dye laser systems, such as disclosed herein, the center frequency of the narrowest filter (etalon 18) is tunable in order to position the output frequency of the laser at any desired frequency within the operating range of the laser. In the present invention it is not necessary that this filter 18, and thus the specific limits of the mode jump frequency span, be fixed but only that the maximum rate of tuning of that filter be slower than the rate of adjustment of the fastest frequency control elements within the dye laser cavity. Thus, such fast control element (such as the folding mirror 10 mounted on the piezoelectric element 22) defines the servo system response time and defines the maximum rate of excursion controlled by the servo, thereby defining the rates of excursion beyond that maximum which are not controlled by the servo. The filter 18 will effectively be stationary, thus holding the pass band frequency of that filter substantially constant, during any such uncontrolled cavity length excursion, since the filter 18 tunes more slowly than any uncontrolled excursion. The effect of this relationship between the adjusting rates of the fast adjusting element 22 and the tuning rate of the filter 18 is thus to limit any resulting output radiation frequency change to being within the predetermined mode jump frequency span of the filter 18. The effect of this arrangement unlike prior art arrangements, is to broaden the transmission pass band width and pass band spacings of the reference interferometer and thus to push the unstable zero crossings of the discriminant signal out beyond the mode jump limits. This structure is contrary to that of the conventional prior art reference interferometer structures which emphasize a narrow passband width and spacing in order to facilitate generating a steep discriminant slope in the vicinity of the lock point.

With the foregoing background the structure of the frequency control and tuning servo system of the preferred embodiment of this invention may be considered in more detail. Specifically, with respect to the laser system illustrated in FIG. 1 it may be seen that the laser beam L, upon exiting the dye laser cavity through partially transmissive mirror 12, encounters two beam splitters 24 and 26, which may be of conventional configuration. These beam splitters 24 and 26 serve to split off portions $L_{R1}$ and $L_{R2}$ respectively, of the laser beam L for reference purposes, while passing portion $L_O$ of the laser beam as the dye laser output. Reference beam $L_{R1}$, reflected off beam splitter 24, is folded again by mirror 28, directed through intensity attenuator 30 and then on to first radiation detector 32. The second reference beam, $L_{R2}$, is folded by mirror 34 into reference cavity 36. The reference cavity 36 is of conventional structure and may conveniently be dimensioned to have a spacing between resonant frequencies (axial modes) of one GHz. Within the reference cavity is also provided a tunably adjustable member 38 substantially similar to the tipping Brewster plate 20 in the dye laser cavity. This tipping Brewster plate 38 may be used to adjust the total optical path length of the reference cavity 36 in the wellknown manner and for a purpose to be described below. As is well known, when the frequency of the reference beam $L_{R2}$ lies near one of the multiple resonant frequencies (axial mode or pass band) of the reference cavity 36, the beam is then transmitted out of the cavity and may be directed onto second radiation detector 40. The intensity attenuator 30 through which reference beam $L_{R1}$ passes is collected to reduce the intensity of the beam $L_{R1}$ to approximately half the maximum intensity of the portion of beam $L_{R2}$ transmitted by the reference cavity 36.

Since the reference interferometer cavity inherently has a transmission curve in which the proportion of incident light transmitted is a function $T(v)$ of the frequency ($v$) of the incident light, the signal output from detector 40 is a curve defined as $P_O T(v)$ where $P_O$ represents the output power or intensity of the laser beam. This curve is illustrated in FIG. 3 of the drawings. The signal output of detector 32 is illustrated in FIG. 3 as the horizontal line $P_O A$ where $P_O$ is the laser beam intensity and A is the attenuation applied to the reference beam $L_{R1}$ by the attenuator 30. Thus, the signal level $P_OA$ of detector 32 is independent of the frequency of the laser beam and is constant regardless of the frequency of the incident laser beam, being solely dependent upon the laser beam intensity. The attenuator 30 is selected to make $P_OA$ about ½ the maximum value $V_m$ of the $P_OT(\nu)$ curve, as illustrated in FIG. 3. As described in detail in the Wise application Ser. No. 701,856, the reference interferometer 36 is adjusted such that the desired operating frequency, $\nu_{lock}$, at which the laser frequency control servo system is desired to be locked, occurs about half way up the transmission curve $T(\nu)$ of the reference cavity 36. Thus, when the dye laser is operating at the desired frequency, $\nu_{lock}$, the output voltages of both detector 32 and detector 40 equal $V_{lock}$, such that the difference between the signals is zero, thus providing no frequency error signal from differential amplifier 42. If the frequency of the output radiation of the dye laser were to decrease, there would be a positive difference between the signal from detector 40 and that from detector 32, thus generating a control signal to drive the laser frequency back to the lock point frequency. Conversely, if the frequency of the laser output radiation were to increase from the desired lock point value, there would be a negative difference between the signal from detector 40 and that of detector 32, thus also generating a control signal from the frequency adjusting elements in the laser cavity to drive the output radiation frequency back to the lock point frequency.

The properties of a discriminant signal of this type are illustrated in FIG. 3, which illustrates the relationship of the discriminant to the full-width-at-half-maximum (FWHM) of the interferometer mode. For a confocal interferometer of mirror reflectivity r on each surface, having a negligible mirror absorption and a sufficiently small input beam diameter, the expression for full-width-at-half-maximum is:

$$FWHM = \left(\frac{c}{2L}\right)\frac{1}{\pi}\sin^{-1}\left(\frac{1-r^2}{2r}\right) \quad \text{(Eq. 3)}$$

The criterion on the discriminant for this technique then becomes:

$$FWHM > \frac{1}{2}\left(\begin{array}{c}\text{mode-jump}\\ \text{frequency span}\end{array}\right) \cong \frac{c}{4D} \quad \text{(Eq. 4)}$$

The last inequality of the equation 4 above thus is the lower limit set by the minimum symmetrical mode jump frequency span. In order to satisfy the foregoing requirements, a low mirror reflectivity and short interferometer length (L) are favored, contrary to the teachings of the prior art such as the above referenced paper by Barger, Sorem and Hall. In one practical application, the length L and mirror reflectivity were chosen to be L=7.5 cm and r=0.66 in a confocal interferometer to give FWHM equal to 280 MHz, as opposed to 10 MHz taught in the prior art.

From the foregoing description it may thus be seen how the signals from detectors 32 and 40 are fed into differential amplifier 42 for creation of the above described electronic discriminant signal in the manner described in the paper by Barger, Sorem and Hall, referenced above and in the paper entitled "Frequency Stabilization of a CW Dye Laser" by Grove, Wu and Ezekiel, Proceedings of the SPIE, Vol. 49, pp. 75–79 (1975). This discriminant signal, as described above, ideally is maintained at a zero level when the resonant frequency of the reference interferometer matches the output radiation frequency of the laser. Whenever there is a variation between these two frequencies, the discriminant signal exhibits a variation away from zero, thus indicating any variation between the desired frequency at which the reference interferometer is controlled and the actual resulting dye laser output frequency. This error signal from the differential amplifier 42 is then applied through drive amplifier 44 to fast control element 22 and through error amplifier 46 and drive amplifier 48 to the slower Brewster plate control element 20 as well as to adjustable thin etalon 16 and to the adjustable etalon tuning filter 18, thus causing adjustment of the dye laser cavity elements to bring the laser cavity output radiation frequency into coincidence with that of the reference interferometer cavity. As noted above, the various elements are designed such that there is only one lock point and no unstable zero crossings within the mode jump frequency span of filter 18, also as illustrated in FIG. 3, for purposes to be described below. In the manner described in the above referenced paper by Grove, Wu and Ezekiel, the feedback signal to the adjustable thick etalon 18 is applied in a modulated form through a phase sensitive detector and drive amplifier 52 to maintain the proper adjustments of thick etalon 18 and the output radiation frequency.

While the foregoing describes the structure and operation for frequency stabilizaion of the laser at a single frequency, it is to be recognized that such a tunable laser may have its frequency tuned over a substantial spectral range. The structure and method for achieving such tuning may conveniently be such as described in the Berg et al application Ser. No. 692,537, referenced above and assigned to the assignee of the present invention. In such structure an adjustable frequency control, illustrated as element 56 on FIG. 1, may serve to tune both the reference interferometer 36 and also the adjustable optical filter 18.

In addition to providing for the basic frequency stabilization of a laser system, described above, another advantage of the present invention is that, by limiting the steady laser output frequency to a small range, by prompt relocking after any large and fast excursions, it becomes practical to include very fast-acting control elements (electro-optical tuners, etc.) which generally have a very limited frequency correction range. This capability becomes apparent from a general analysis of servo systems.

A servo system is characterized by the correction gain of the feedback system, the loop gain G(f), as a function of frequency f of the excursion of the variable controlled by the servo. If A(f) is the excursion amplitude at the repetition rate f with the servo disconnected from the system, then the amplitude A'(f) when the servo is applied is $$\frac{A'(f)}{A(f)} = \frac{1}{|1 - G(f)|} \quad \text{(Eq. 5)}$$

For all frequencies f where the loop gain magnitude is greater than unity, a phase shift of $\pi$ of the gain function G(f) can produce a zero in the denominator of equation 5, which physically results in oscillation of the variable (frequency) controlled by the servo. In other words, the stable, negative feedback becomes a positive feedback. It is well known that to avoid a phase shift of this magnitude the loop gain must be rolled off from the DC gain value to below unity at high frequencies at a rate which must be less than 12db/octave to avoid oscillation. Thus, the larger the frequency $f_1$ where the loop gain function crosses unity, $G(f_1)=1$, the tighter the servo control can be at low frequencies, due to the maximum rate the gain is allowed to rise with decrease in frequency.

What typically puts an upper limit on the unity gain frequency $f_1$ is a resonance in the response of the control elements. For drive frequencies below the control element resonant frequencies, the transducer response is proportional to the drive. Near resonance the response becomes nonlinear and the unity gain frequency must be restricted to some small fraction (typically ⅓) of the lowest resonant frequency of the controlled element to prevent oscillation of the servo system. In the case of the preferred embodiment described above the mechanical resonances of the dye cavity output frequency adjusting elements 16, 20 and 22 determine the servo system unity gain frequency. Generally the higher the first resonant frequency of the control element, the more limited is the length change that can be produced. For example, a galvanometer tipped Brewster plate, such as element 20, can produce 30 microns of optical path length change with a 2 kHz first resonance; a piezoelectrically moved mirror such as element 22 can produce one micron of path change with a 50 kHz first resonance, and an electro-optic crystal (not illustrated) may give a 0.1 micron path change with a 1 MHz first resonance.

The root-mean-square average optical output bandwidth of the dye laser decreases as the unity-gain frequency of the servo system is increased by adding faster control elements, thus allowing a larger loop gain at all of the excursion frequencies under servo control. However, since the range of these added elements is proportionately limited, to obtain substantial benefit from the addition of these fast control elements, the slower, larger range elements of the system must be designed in accordance with the principles of the present invention. Then the output frequency will be promptly returned within the limited acting range of the fast transducer after any perturbation of the dye laser beam, avoiding a heretofore tedious search to obtain reacquisition of frequency lock. Thus, the system will become immune to large amplitude excursions, and a useful duty cycle of the fast-transducer operation will be provided.

Typically, to provide a wide range of frequency control with a large servo system unity-gain frequency, the servo system employs several control elements with steps of decreasing range but increasing speed, with cross-over networks coupling the elements so that each receives the component of frequency error signal appropriate to its rate of response, in a manner analogous to the cross-over networks of high fidelity audio systems utilizing several speakers of different sizes.

The magnitude of the loop gain G is determined by the product of the slope of the optical frequency discriminant at the lock point, times the amplifier gain applied to the discriminant. The first factor may conveniently be considered the optical gain factor and the second the electronic gain factor. To a first order approximation, these factors may be traded off against one another with the output loop gain bandwidth depending only on their product, by virtue of equation 5 above. This trade-off explains the emphasis in the prior art of obtaining a large optical gain factor as one contributor to total loop gain G. However, since the gain magnitude is actually limited by the transducer resonances, the prior art use of large optical gain and concomitantly small electronic gain and the present invention where the relative gains are reversed, provide loop gain bandwidths which are equivalent, although achieved in significantly different manner.

ACQUISITION OF FREQUENCY LOCK

In FIGS. 4A–4C the events during the acquisition of frequency lock by the adjustable thick etalon filter 18 are illustrated. Since the method and apparatus of the present invention requires that the mode jump frequency span be contained between adjacent unstable zero crossings of the discriminant, a logical problem exists if, upon initiation of lock frequency acquisition, no stable lock point is contained within the mode jump span, as illustrated in the situation of FIG. 4A. By design, as indicated above, the laser cavity length changing or frequency control elements 20 and 22 respond much more quickly than the transmission pass band center frequency of the thick etalon 18 can be tuned. As described above, this design requirement causes the thick etalon 18 to provide the local frequency reference to be able to recover the initial lock point after a perturbation of the cavity length.

Illustrated in FIG. 4B is the case in which both the thick etalon pass band and the laser oscillating frequency are being tuned toward the lock point frequency $f_{lock}$. As noted above, the laser oscillating frequency may initially be tuned much faster than the etalon pass band may be adjusted. As the laser oscillating frequency is brought toward the lock point at lower frequency, as illustrated in FIG. 4B, the lower mode jump limit is encountered, as illustrated by the solid line oscillating frequency curve, thus causing the frequency to mode jump back near the starting point, as illustrated by the broken line oscillating frequency curve, and preventing acquisition of the lock frequency. To prevent undesired repeated cycling between the mode jump limits, means are provided for slowing the response time of the frequency adjusting elements to a rate similar to the tuning rate of optical filter 18 at any time during frequency acquisition where there is a large offset between the thick etalon transmission peak and the lock point, in order to allow the thick etalon 18 to be tuned at its inherently slow rate onto the lock point. This is conveniently provided in FIG. 1 by the use of zener voltage limiters 58 and 60 in parallel with the drive amplifier 44 to the fast control element 22. These voltage limiters 58 and 60 limit the drive voltages to the fast control elements when the frequency error is beyond the adjustment range of the fast control element 22. Effectively, these voltage limiting elements 58 and 60 allow the fast control element 22 to be driven to saturation at one limit of its excursion and to remain there as long as the lock point is outside the mode jump frequency span of the thick etalon 18. During this saturation condition the coupling capacitor 62 between the differential amplifier 42 and the drive amplifier 44 charges to provide a recovery time delay after the saturation drive signal is removed from drive amplifier 44 before the control function of element 22 becomes active again. This delay can be made long enough to allow the slower, longer range control element 20 to bring the laser oscillating frequency to the lock point at a rate which the thick etalon 18 tuning can follow. When the pass band or mode jump frequency span of the thick etalon has been tuned to include the lock point frequency $f_{lock}$, as illustrated in FIG. 4C, then the situation is simply that illustrated in FIG. 3 and in which the laser may only oscillate within a limited range about the lock point frequency so that frequency lock may readily be maintained by the servo system.

As the tunable filter 18 and slow laser frequency control element 20 move the oscillating frequency of the laser to the lock point during acquisition, mode jump cycling may occassionally occur due to dye frequency jitter or noise, since, due to the saturation and recovery time delay, the control function of the fast control element 22 is unavailable to the system during this acquisition time period. Accordingly, there may be an occasional buildup, for example, in a random walk or other fashion, of offset acquired by the slow frequency control element 20 from the center of its range such that final lock may occur on a laser cavity mode other than the centered $n^{th}$ mode. These offsets may accumulate and eventually limit the ability of the system to lock automatically due to exhaustion of the range of adjustment in the slow control element 20. According to this invention, this limitation is readily removed by the addition of the reset or centering circuit illustrated in FIG. 1 to momentarily zero the error input signal to the control element 20 to drive it to its generally centered, zero error signal position.

This slow control element centering circuit functions by detecting the total offset of the slower frequency control element 20 from the center of its range adjustment and then momentarily removing the discriminant signal from that slower frequency control element when the offset exceeds a predetermined value. The total offset of the slower control element 20 from the center of its range is monitored by measuring the output of the error amplifier 46, using operational amplifier comparators 64 and 66 set to predetermined positive and negative voltage levels. These comparators 64 and 66 produce a reset signal whenever the output of the error amplifier 46 exceeds the predetermined levels of either comparator 64 or comparator 66. Such a reset signal then triggers the timer 68 which opens the frequency servo loop and reduces the output of the error amplifier 46 to zero by turning field effect transistors 70 and 72 on for a predetermined time, thus grounding and removing the error signal from the amplifier 46 and discharging capacitor 73, thus reducing the output of amplifier 46 to zero. Thus, the drive signal to amplifier 48 is reduced to zero, causing the frequency control element 20 to be driven to its generally centered, zero error signal position. After the expiration of the predetermined (brief) time the timer turns off the field effect transistors 70 and 72 and recloses the frequency servo loop, thus enabling the control element 20 again to operate under the control of the servo system, again being centered within its range of excursion. Since this interruption of the operation of the control element 20 is relatively brief, this system treats this deliberately introduced interruption as if it were any large, fast random perturbation of the laser cavity length, and promptly returns the output frequency to the initial lock frequency.

Since this foregoing structure provides for automatic reacquisition of the lock frequency of the laser system, despite any arbitrarily large and rapid perturbations of the effective optical length of the laser cavity, this system provides for periods of operation of unlimited duration and constant output frequency, despite the presence of such momentary perturbations or interruptions of lasing.

Alternate Discriminant Signal

In FIG. 5 a second desirable means of generating the necessary discriminant signal of this invention is illustrated. This structure utilizes all of the apparatus of FIG. 1 with additional changes being made to the reference interferometer. For the sake of clarity and comparability the same reference numbers have been retained for the common elements and only the different structure required for this discriminant generating means has been illustrated.

Laser reference beam $L_{R2}$ is directed into the interferometer cavity in the same manner as with the previously described embodiment. This reference beam $L_{R2}$ is polarized by the laser in some predetermined plane defined by the vector E illustrated in FIG. 5, vector E for purposes of illustration being shown in the vertical direction. This reference beam $L_{R2}$ then enters the reference cavity 36 through the first partially transmissive interferometer end mirror 74 which may be mounted for tuning adjustment to an adjustable member 76, conveniently in the form of a piezoelectric element. This adjustable member 76 is connected to the adjustable frequency control 56 in substantially the same manner as was the tipping Brewster plate 38 in the embodiment of FIG. 1. The reference beam $L_{R2}$ resonates within the interferometer cavity defined by the first end mirror 74 and the second partially transmissive end mirror 78. Within the cavity is placed a fused quartz plate 80 with a force being applied to the plate in a direction at an angle $\theta$, suitably 45°, with respect to the plane of polarization of the laser beam $L_{R2}$. As is well known, a small birefringence is thus produced in the plate by the stress induced by this force so that the optical path length within the interferometer cavity is different for that component of the laser radiation which is polarized along the stress direction than for the component of the laser beam polarized in a direction normal to the stress direction. Thus, this birefringent element 80 serves to resolve the laser beam $L_{R2}$ into two orthogonally polarized beam components, one component being polarized along the stress direction and the other normal to that direction. By virtue of this difference in effective optical path length for the two components within the interferometer cavity, the optical transmission peak frequency out of the interferometer cavity for one of the beam components will be slightly different from that of the other beam component.

The two coincident but orthogonally polarized beam components emerge from the reference interferometer through partially transmissive end mirror 78 and then pass into the polarizer or beam separator 82, which passes one of the mutually orthogonally polarized beam components, $L_{RP1}$, straight through it while reflecting the other component $L_{RP2}$. Beam component $L_{RP1}$ is then directed into first detector 40 and produces an output signal $S_1$, the oscilloscope trace of which is illustrated in FIG. 6A, while beam component $L_{RP2}$ directed into second detector 41 produces output signal $S_2$. These two signals are both fed into differential amplifier 42 (the output of reference detector 32 being removed from amplifier 42) which takes the difference of the two signals, effectively subtracting signal $S_2$ from signal $S_1$ by inverting signal $S_2$ to yield the combination illustrated in FIG. 6B. When signal $S_2$ is subtracted from signal $S_1$, by combining signal $S_1$ and signal $-S_2$ of FIG. 6B, the resulting discriminant is that shown in FIG. 6C.

In the example illustrated by the oscilloscope traces represented in FIGS. 6A through 6C, two kilograms of force were applied to a two milimeter thick plate of fused quartz in a direction near 45° to the plane of polarization of the light traversing the interferometer. This arrangement produced 200 MHz of frequency offset for the two polarized beam components in a non-mode matched confocal interferometer cavity having a 1 GHz mode spacing. Since the same incoming laser beam is used to produce both polarized beam components it is apparent that the discriminant produced from this apparatus will be inherently independent of any intensity variations of the incoming beam. The discriminant produced by this structure, illustrated in FIG. 6C, has a simple symmetry with the slope at the lock point (the steep zero crossing point) being less directly tied to the slope at the unstable zero crossing point than is the discriminant produced by the structure of FIG. 1. The frequency difference between the lock point and the unstable zero crossing point is just half the interferometer mode spacing, independent of mirror reflectivity. Thus, the requirement for automatic locking with this type of discriminant, that there be no unstable zero crossings within the mode jump frequency span, is that half the interferometer mode spacing be greater than half of the mode jump frequency span, as illustrated in FIG. 6C.

For automatic locking to be effective with this birefringent structure, the magnitude of the discriminant slope at all points within the mode jump frequency span should be greater than zero in order that the relocking may take place promptly. This requirement must be kept in mind during design of the structure, since, as the slope at the lock point is increased by raising the mirror reflectivity in this discriminant producing structure, the slope at the unstable zero crossing decreases. While this structure for generating a frequency discriminant signal is somewhat more complex than that of FIG. 1, for a given relocking time the discriminant so produced by this structure can be made about four times as steep at the lock point as that of FIG. 1, thus easing the system design constraints.

Although the structure illustrated in FIGS. 1 and 5 discloses two methods and necessary apparatus for generating suitable discriminants, it will be apparent to those skilled in the art that numerous other structures and methods will produce equally suitable discriminants, such structures including, without limitation, the use of resonant atomic or molecular absorption or fluorescence, and optical rotation or polarization change, to name a few.

While the foregoing illustrates a particularly preferred embodiment of the method and apparatus of this invention, with two approaches to the generation of a suitable discriminant being described, it will readily become apparent to those skilled in the art that numerous other equivalent approaches are suitable, all being within the scope of this invention. Accordingly, the scope of this invention is to be limited not by the above disclosed preferred embodiment but solely by the claims appended hereto.

What is claimed is:

1. A frequency controlled, tunable laser system which may be tuned selectively to any predetermined output radiation frequency within its operating range and servolocked to maintain that output frequency and which includes means for rapidly and automatically reacquiring said predetermined output radiation frequency despite momentary perturbations of laser oscillation, comprising a laser having a tunable output radiation frequency;

a narrow-bandpass, selectively adjustable optical filter mounted within the cavity of said laser, said filter being adjustable to tune its pass band over said laser operating frequency range at a predetermined maximum tuning rate and having pass bands sufficiently narrow that only a single laser cavity mode adjacent the center of one predetermined said pass band may obtain sufficient net optical gain to oscillate, the frequency range within said predetermined pass band within which such laser cavity mode may vary and still oscillate being defined as the mode jump frequency span of said filter; and a feedback control servo system for locking said laser output radiation to said predetermined frequency, said control system comprising means for generating from said laser output radiation an electronic discriminant signal which has not more than one stable zero crossing lock point corresponding to a predetermined frequency within said optical filter mode jump frequency span and which has no other zero crossings within said mode jump frequency span, at least one laser frequency control element other than said optical filter positioned within said laser cavity and being operable in response to said discriminant signal to adjust said laser output radiation frequency by adjusting the effective length of said laser cavity, and means for applying said discriminant signal to said frequency control elements to drive said laser output radiation frequency toward said lock point within said mode jump frequency span, whereby the laser system may rapidly reacquire the predetermined output radiation frequency lock point despite arbitrarily large momentary perturbations of the laser oscillation.

2. A tunable laser system according to claim 1 wherein said frequency control element comprises at least one fast adjusting element having a rate of frequency adjustment substantially greater than said maximum tuning rate of said adjustable optical filter, whereby the rate of any variations in the laser cavity effective length beyond the rate of adjustment of that fast adjusting element and thus the control of that fast adjusting element is substantially beyond the maximum tuning rate of that adjustable optical filter, whereby the pass band frequency of that optical filter remains substantially constant during such an uncontrolled cavity length change and thus limits any resulting output radiation frequency change to its mode jump frequency span.

3. A tunable laser system according to claim 2 further comprising means for slowing the rate of frequency adjustment of said fast frequency control element to a rate similar to that of said optical filter whenever said discriminant signal lock point frequency is outside said optical filter mode jump frequency span, whereby the pass band frequency range of the optical filter may be tuned toward the lock point frequency without substantial output radiation frequency variations from the fast frequency control element during such tuning.

4. A tunable laser system according to claim 2 further comprising at least one additional said frequency control element having a rate of frequency adjustment slower than said rate of said fast frequency control element and having a predetermined range of frequency adjustment, means for detecting the total offset of said slower frequency control element from the center of its said range of frequency adjustment, means for momentarily removing said discriminant signal from said slower frequency control element when said offset exceeds a predetermined value, driving said slower frequency control element to about the center of said range of frequency adjustment while said discriminant signal is so removed, and then re-applying said discriminant signal to said slower frequency control element, whereby the slower frequency control element may again be centered to enable it to continue its frequency control function whenever it approaches the limits of its range of adjustment.

5. A tunable laser system according to claim 1 wherein said laser output radiation comprises a beam polarized along a predetermined direction and wherein said discriminant signal generating means comprises a reference interferometer receiving a portion of said laser output beam and having within its optical cavity a birefringent element having its direction of birefringence oriented at an angle to said laser output beam polarization direction, whereby the received laser beam is resolved into two orthogonally polarized beam components by said birefringent element, the birefringence of said element providing a different optical path length for one said beam polarization component than for the other said beam polarization component, whereby the interferometer optical transmission peak frequency for one of the beam components differs from the interferometer optical transmission peak frequency for the other beam component, means for detecting separately each of said two orthogonally polarized beam components and for providing electronic output signals proportional to the intensity of said beam components detected, and means for subtracting said output signal corresponding to one said beam component from said output signal corresponding to the other said beam component and providing an output signal equal to the difference of said signals, whereby the electronic discriminant signal may comprise that difference output signal.

6. In a frequency controlled, tunable laser system which may be tuned selectively to any predetermined output radiation frequency within its operating range and servolocked to maintain that output frequency, and which includes a frequency tunable laser and a narrow band pass, selectively adjustable optical filter mounted within the cavity of that laser and being adjustable to tune its pass band over the laser operating frequency range at a predetermined maximum tuning rate and having pass bands sufficiently narrow that only a single laser cavity mode adjacent the center of one predetermined such pass band may obtain sufficient net optical gain to oscillate, the frequency range within the predetermined pass band within which the laser cavity mode may vary and still oscillate being defined as the mode jump frequency span of the filter, and which system further includes a feedback control servo system for locking the laser output radiation to a predetermined frequency, the method of rapidly and automatically reacquiring the predetermined output radiation frequency despite momentary perturbations of laser oscillation, comprising generating from the laser output radiation an electronic discriminant signal which has not more than one stable zero crossing lock point corresponding to a predetermined frequency within said optical filter mode jump frequency span and which has no other zero crossings within said mode jump frequency span, and applying said discriminant signal to at least one laser frequency control element, other than said optical filter positioned within the laser cavity to adjust the laser output radiation frequency by adjusting the effective length of the laser cavity to drive the laser output radiation frequency toward said lock point within said mode jump frequency span, whereby the laser system may rapidly reacquire the predetermined output radiation frequency lock point despite arbitrarily large momentary perturbations of the laser oscillation.

7. The method of claim 6 wherein the rate of adjustment of said one laser frequency control element is substantially greater than said maximum tuning rate of said adjustable optical filter, whereby the rate of any variations in the laser cavity length beyond that rate of adjustment and thus the control of that frequency control element is substantially beyond the maximum tuning rate of the adjustable optical filter, whereby the pass band frequency of that optical filter remains substantially constant during any such uncontrolled cavity length change and thus limits any resulting output radiation frequency change to within its mode jump frequency span.

8. The method of claim 7, further comprising slowing the rate of frequency adjustment of said one frequency control element to a rate similar to that of said optical filter whenever said discriminant signal lock point frequency is outside said optical filter mode jump frequency span, whereby the pass band frequency range of the optical filter may be tuned toward the lock point frequency without substantial output radiation frequency variations from the fast frequency controlled element during such tuning.

9. The method of claim 7 further comprising adjusting said laser output frequency by adjusting another frequency control element having a rate of frequency adjustment slower than the rate of said one frequency control element and having a predetermined range of frequency adjustment, detecting the total offset of said other frequency control element from the center of its said range and frequency adjustment and momentarily removing said discrimnant signal from said other frequency control element when said offset exceeds the predetermined value, driving said other frequency control element to about the center of said predetermined range of frequency adjustment while said discriminant signal is so removed, and reapplying said discriminant signal to said other frequency control element, whereby the other frequency control element may again be centered to enable it to continue its frequency control function whenever it aproaches the limits of its range of adjustment.

10. The method of claim 6 wherein said laser output radiation comprises a beam of laser radiation polarized along a predetermined direction and wherein said discriminant signal is generated from a referenced interferometer by the steps of:

passing a portion of said laser output beam through said reference interferometer and thus through a birefringent element positioned within the interferometer cavity and having its direction of birefringence oriented at an angle to the laser output beam polarization direction, whereby the laser beam through the birefringent element may be resolved into two orthogonally polarized beam components by said birefringent element, the birefringence of said element providing a different optical path length for one said beam polarization component than for the other said beam polarization component, whereby the interferometer optical transmission peak frequency for one of the beam components differs from the interferometer optical transmission peak frequency for the other beam component, detecting separately each of said two orthogonally polarized beam components and generating electronic output signals porportional to the intensity of said beam components detected, and subtracting said output signal corresponding to said one beam polarization component from said output signal corresponding to said other beam polarization component to generate a signal equal to the difference between those two said output signals, whereby the electronic discriminant signal may comprise that difference signal.

* * * * *